July 19, 1960

H. M. SEARS 2,945,713

SWIVEL TYPE CLAMP

Filed Sept. 24, 1956

HARTLEY M. SEARS
INVENTOR.

BY

ATTORNEY.

July 19, 1960  H. M. SEARS  2,945,713
SWIVEL TYPE CLAMP
Filed Sept. 24, 1956  2 Sheets-Sheet 2
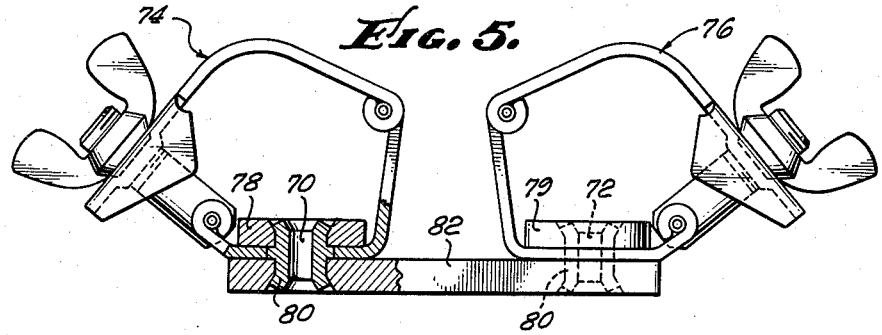
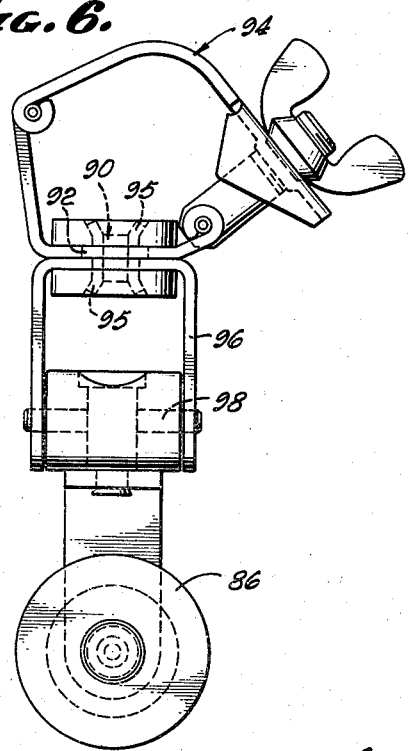
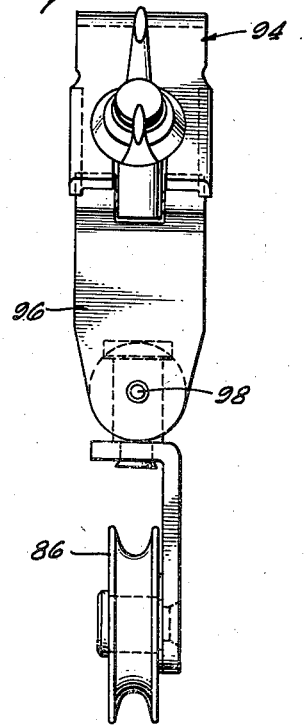
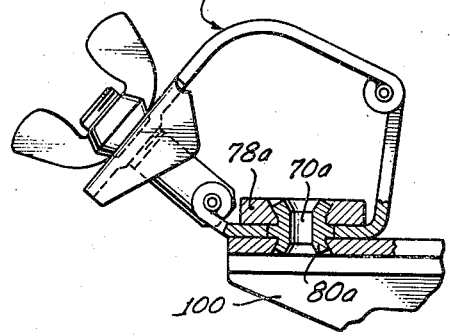
HARTLEY M. SEARS
INVENTOR.
BY
ATTORNEY.

United States Patent Office 2,945,713
Patented July 19, 1960

2,945,713

SWIVEL TYPE CLAMP

Hartley M. Sears, Pasadena, Calif., assignor to Hyval Products Co., Pasadena, Calif., a corporation of California Filed Sept. 24, 1956, Ser. No. 611,596

5 Claims. (Cl. 287—54)

This invention relates to clamp mechanisms and particularly to an adjustable clamp of simple construction including a swivel axis and adapted to receive and firmly hold an elongated object at any desired angle to such swivel axis. Although exemplary embodiments of such clamp mechanisms are hereinafter described as particularly adapted to use in the erection of surgical traction apparatus, exercise bars, etc., in hospitals, convalescent homes, etc., the clamping devices of the invention are also adapted to many other and different uses; for example, in the erection of scaffolding, acrobatic playground devices and various other temporary, or semipermanent structures.

Heretofore conventional clamp mechanisms adapted for both industrial and home use have generally relied on specially designed engaging elements such as ratchets, friction discs, threaded elements and the like. Such mechanisms in addition to being difficult and expensive to manufacture, frequently fail to function successfully throughout hard or prolonged periods of use. For example, minor damage or malfunction of an engaging part may render the entire device inoperative, or seriously limit its further usefulness. Specifically, it is not uncommon that wear of a ratchet or friction surface will render a clamp mechanically useless long before the anticipated life of the device has been reached.

Another difficulty of prior mechanisms is a frequent inability to properly align clamped objects at desired angles with respect to other objects or to supporting structures mounting the clamp. Ratchet type clamps, for example, may be aligned or positioned only at the angles permitted by the ratchet projections; yet these projections frequently are spaced in angular steps of at least five to twenty degrees or larger. On the other hand, many clamping applications, such as the positioning of tubular elements used in surgical traction apparatus, exercise bars, etc., require precise angular alignments for best results.

The present invention is directed to what now appears to be a simple solution to the above and to many additional problems, as will appear. Accordingly one object of the invention is to provide a simply constructed adjustable clamp, including a swivel axis, that is adapted to firmly receive and hold an elongated cylindrical object in any desired angle traversing the swivel axis.

Another object of the invention is to provide a clamping mechanism of a type particularly adapted to the positive grasping and positioning of tubular elements that is light and strong, simple and inexpensive to manufacture and which does not require costly, hard to use, ratchets, threaded elements, or the like.

Another object of the invention is to provide such a clamp construction, involving a novel arrangement of elements and parts, that permits and insures placement of tubular elements in planes that are either parallel or perpendicular depending upon the construction of the clamp.

A still further object of the invention is to provide a clamp construction that not only permits a novel rapid assembly of the clamp parts but also a positioning of tubular elements by such parts at any desired angle to one another or to a supporting structure.

Other objects and advantages of the invention will be apparent from the following description and from the drawing in which:

Fig. 5 is a view in section and in elevation of a modified clamp construction employing two swivel axes;

Fig. 6 and Fig. 7 are front and side elevations, respectively, of a further modification including a pulley; and Fig. 8 is a view in section and in elevation of a further modification adapted to a fixed support.

Figure 1:
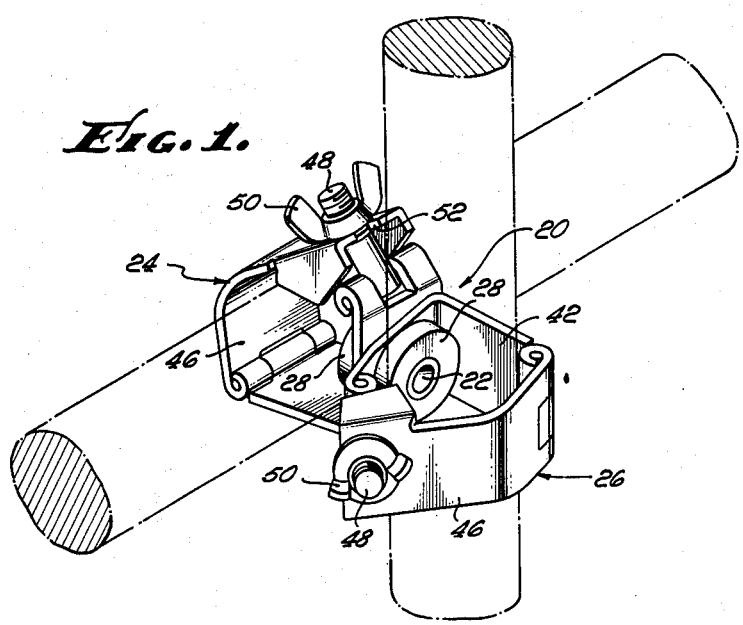
Fig. 1 is a perspective view of a clamp construction embodying the invention.

Generally stated, a clamp of the invention comprises a pair of abutment members, at least one of which supports a clamp assembly, irremovably held in spaced relation adjacent a common swivel axis by a unique spacing and holding means extending through the members and coaxial with the swivel axis. Each clamp assembly is journaled for rotation about such swivel axis. However, upon tightly clamping a cylindrical or tubular object within a clamp assembly, the assembly, abutment member and holding means are each immobilized with respect to one another and with respect to the clamped object. As a result an object may be clamped, and thereby rigidly positioned with respect to the swivel axis, without interfering with the free rotation of other clamp assemblies forming part of the clamp. Upon tightening the latter, additional objects may be similarly rigidly positioned with respect to the swivel axis.

In a preferred embodiment of the invention illustrated in Figs. 1 to 4, 20 indicates a clamping device employing a single swivel axis, as at 22, on which are journaled a pair of clamp assemblies 24 and 26. With this device a pair of elongated cylindrical objects may be held at any desired angle traversing the single swivel axis (as indicated in phantom outline in Fig. 1) by the simple expedient of clamping the device first to one object and then to the other, with the objects being positioned or aligned as desired during the clamping operation. The net effect is a rapid, efficient clamping of the objects with a minimum of time and effort.

These desirable features of adjustment and use of the clamp 20 are due primarily to a novel structural combination forming the swivel axis 22. In the device illustrated, this swivel axis comprises essentially a pair of abutment members 28 irremovably held in spaced relation by a hollow spacing and holding rivet 34. As shown, the abutment members 28 are in axial alignment and each is provided with an aperture 30 having an oppositely and outwardly flaring conical surface 32, with the common axis of the apertures constituting the swivel axis 22. Inner opposing faces 36 of the abutment members are flat and in substantially parallel planes. Each of the outer faces of the abutment members is adapted to contact a bar, standard, supporting member or other elongated cylindrical object (as indicated in phantom outline in Fig. 1).

Figure 3:
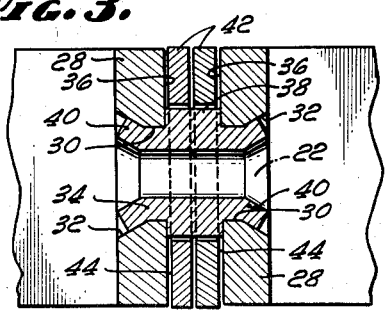
Fig. 3 is an enlarged view in horizontal section along the line III—III of Fig. 2.

As best seen in Fig. 3, the spacing and holding rivet 34 extends through the aligned apertures 30 of the abutment members, and is provided with an intermediate spacing shoulder 38 extending radially outward between the opposing faces 36 of the abutment members. In accordance with the invention, end portions 40 of the rivet are expanded outwardly following assembly of the clamp parts so as to be firmly seated against the conical surfaces 32 of the abutment members 28. As a consequence, the abutment members are fixedly and irremovably held against the spacing shoulder 38 to thereby unite the assembled parts into a rigid swivel unit.

Figure 2:
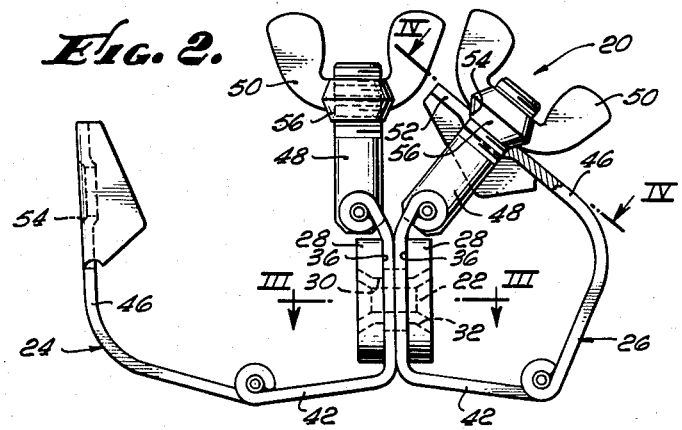
Fig. 2 is a view in section and in elevation of the clamp of Fig. 1, showing details of its construction.
Figure 4:
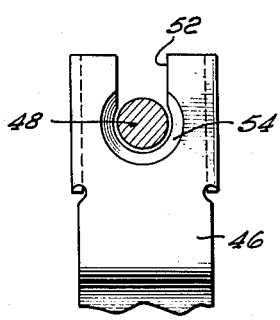
Fig. 4 is a detail view along the line IV—IV of Fig. 2.

Journaled loosely about the spacing shoulder 38 of the composite swivel unit are the pair of oppositely extending clamp assemblies 24 and 26. As illustrated, each clamp assembly includes a ported element 42 receiving the spacing shoulder and having a substantially flat positioning surface 44 in parallel opposed relation to the inner opposing faces 36 of the abutment members. Adjustment means including a latch element 46 hingedly secured to one end of a ported element 42, and a lock bolt 48 and wing nut 50 hingedly secured to the other end, permit a cylindrical or tubular element to be encircled and forced into contact with the adjacent abutment member 28, thereby insuring a firm holding engagement. Preferably the lock bolts 48 are engageable in open ended slots 52 provided in the free ends of the latch elements 46, the material of the latch elements being deformed into substantially conical surfaces 54 opening outwardly from the main clamp structure (Figs. 2 and 4). Corresponding conical surfaces 56 provided on lower surfaces of the wing nuts and engageable with the depressed surfaces 54, serve to prevent accidental loosening of the clamping assemblies by movement of the lock bolts out of the open ended slots 52.

The operation of the clamp device of Figs. 1 to 4, in a typical clamping application, will now be described. Assume, for example, that it is desired to clamp an exercise bar or similar tubular element in horizontal relation extending outward from a vertical stand, bed post or the like as in Fig. 1. The clamping assembly 26 is first opened and positioned about the supporting vertical member. The wing nut 50 is next tightened on the lock bolt 48 to force the supporting member against the outer face of the abutment member 28, simultaneously forcing the positioning surface 44 of the latching element against the adjacent opposing face 36 of the abutment member. The swivel unit, including the holding rivet 34 and the abutment members 28, and the clamp assembly 26, are now firmly and non-rotatively held with respect to the vertical support. The clamp assembly 24, however, remaining freely rotatable about the spacing shoulder 38 of the swivel unit and may be oriented with the horizontal bar at any desired angle to the vertical support. Upon tightening the clamp assembly 24, the pressure of the latching element 46 against the horizontal bar similarly forces it firmly into engagement with the abutment member 28, locking both the bar and clamp assembly at the desired angle to the vertical support. If it is desired to vary the angular relation of the bars somewhat, it is only necessary to loosen the pressure on one or the other of the clamp assemblies 24 or 26 and then tighten down again after the newly desired angle is established.

Fig. 5 illustrates a modification of the clamp that is particularly adapted to the placement of tubular or cylindrical objects in parallel planes. Instead of a single swivel axis two swivel axes 70 and 72 journaling clamp assemblies 74 and 76, respectively, are employed. In addition, spaced apart abutment members 78 and 79 are each fixedly secured by holding rivets 80 to a spacing and positioning bar 82, such bar constituting an abutment member opposed to the members 78 and 79. In use, elongated objects may be quickly clamped in each of clamp assemblies 74 and 76, with parallel orientation of such objects being readily facilitated by the positioning of the clamp assemblies on the spacing bar 82.

Figs. 6 and 7 illustrate a further modification, including a pulley 86, that is well adapted, for example, to use with surgical traction apparatus or other such apparatus. As in the case of the holding rivets 80, just described, the spacing and holding rivet 90 includes a spacing shoulder 92 that is only wide enough to journal a single clamp assembly 94. However, prior to expanding the ends of the rivet 95, a pulley support 96 is passed on to the shank of the rivet. Consequently, upon subsequently expanding the rivet ends 95, the pulley support 96 is irremovably held in abutment against the spacing shoulder 92 as part of the swivel unit. If desired, the pulley 86 may be suspended from the support 96 by means of a pivot axis 98, as shown. To use the device, the entire swivel unit including the pulley is rotated to the desired angular position relative to the clamp assembly 94 and the clamp assembly thereafter tightened down on its supporting bar or rod, thereby permitting proper orientation and clamping of the pulley to the support in one simple operation.

Fig. 8 illustrates a further modification of the clamp adapted to use in conjunction with a rigid support 100, such as a bed, table or other such support. In other respects, however, the clamp structure is not unlike the individual assemblies described above in connection with Fig. 5, and need not be further described, corresponding numerals indicating corresponding structure for example, 70 and 70a, and 78 and 78a, and 80 and 80a.

From the above description of exemplary embodiments of the invention it should be apparent that the present invention makes possible a number of highly desired but heretofore unobtainable features in a clamp mechanism. Thus, it makes possible for the first time a simply constructed, easily assembled clamp that provides a firm grasping and positioning of tubular or cylindrical objects with no reliance on costly hard to use ratchets, threaded elements or the like. It especially provides an adjustable clamp, including a swivel axis, that is adapted to quickly and firmly receive and hold an elongated cylindrical object at any desired angle traversing the swivel axis. Finally it provides a clamp device that is ideally suited to the precise alignment and support of such tubular elements, with a minimum of effort and fuss.

To those skilled in the art to which this invention relates, many changes in construction and widely differing embodiments and applications of the invention will suggest themselves without departing from the spirit and scope of the invention. For example, instead of the particular latching construction described and illustrated (employing locking bolts and wing nuts) spring or friction latches might be employed with equal success. In addition, each of the latch and abutment members could be adapted to the grasping and support of elongated objects of polygonal or even irregular configuration in cross section without substantial variation from the principles of the invention. Accordingly, it should be understood that the disclosures and the description herein are purely illustrative and are not intended to be in any sense limiting.

I claim:

1. An adjustable clamp of simple construction, including a swivel axis and adapted to receive and lockingly hold an elongated cylindrical object in any desired angle traversing said swivel axis comprising: a pair of abutment members in spaced relation, each provided with an aperture including an outwardly flaring conical surface, the apertures being in axial alignment with their conical surfaces oppositely and outwardly directed and their common axis constituting a swivel axis, opposing faces of said abutment members being flat and in parallel planes, each of the outer faces of said abutment members being adapted to directly contact an elongated cylindrical object; a spacing and holding rivet extending through said aligned apertures and including a radially extending intermediate spacing shoulder extending between opposing faces of said abutment members, end portions of said rivet being firmly seated against said conical surfaces to irremovably hold said members against said radially extending spacing shoulder; and a clamp assembly including a ported element journaled about said spacing shoulder and having a positioning surface in parallel relation to the opposing face of an abutment member and adjustable means connected to said element for encircling a cylindrical object to hold said object against said outer face of said abutment member and simultaneously force the positioning surface and said opposing face into firm holding engagement.

2. A clamp as stated in claim 1, wherein two clamp assemblies, each including a ported element, are journaled upon said shoulder, said clamp assemblies extending in opposite directions, whereby two cylindrical objects may be firmly connected by said clamp at different transverse angles to the swivel axis.

3. A clamp as stated in claim 1, wherein said ported element of the clamp assembly is hingedly connected to a latch element at one end and provided with a hingedly and irremovably connected lock bolt and wing nut at the other, said lock bolt, wing nut and latch element being arranged to cooperatively and releasably engage to grasp a cylindrical object against said abutment.

4. A clamp as stated in claim 3, wherein said latch element includes a conical surface defining a lock bolt receiving opening, said surface being adapted to engage a corresponding surface on said wing nut.

5. An adjustable clamp of simple construction, including a swivel axis and adapted to receive and lockingly hold an elongated cylindrical object in any desired angle traversing said swivel axis, comprising: a pair of abutment members in spaced relation, each provided with an aperture including an outwardly flaring conical surface, the aperture being in axial alignment with their conical surfaces which are oppositely and outwardly directed and their common axis constituting a swivel axis, opposing faces of said abutment members being flat and in parallel planes, each of the outer faces of said abutment members adapted to directly contact a cylindrical object; a hollow spacing and holding rivet extending through said aligned apertures and including a radially extending, intermediate spacing shoulder extending between opposing faces of said abutment members, end portions of said rivet being firmly seated against said conical surfaces to irremovably hold said opposing faces against said radially extending spacing shoulder and provide a uniform and predetermined distance between said opposing surfaces; and a clamp assembly including a ported element journaled about said spacing shoulder and having a positioning surface in parallel relation to the opposing face of an abutment member and adjustable means connected to said ported element for encircling a cylindrical object and to hold said object against said outer face of said abutment member and simultaneously force the positioning surface and said opposing face into firm holding engagement.

References Cited in the file of this patent

UNITED STATES PATENTS

| | | |
|---|---|---|
| 565,049 | Test | Aug. 4, 1896 |
| 1,899,555 | Campbell | Feb. 28, 1933 |
| 1,942,701 | Hilton | Jan. 9, 1934 |
| 2,091,763 | Macbeth | Aug. 31, 1937 |
| 2,101,317 | Lemieux | Dec. 7, 1937 |
| 2,165,221 | Burton | July 11, 1939 |
| 2,406,940 | Brill | Sept. 3, 1946 |

FOREIGN PATENTS

| | | |
|---|---|---|
| 340,337 | Italy | Mar. 11, 1936 |
| 636,594 | Great Britain | May 3, 1950 |